(12) United States Patent
Kim et al.

(10) Patent No.: US 8,117,477 B2
(45) Date of Patent: Feb. 14, 2012

(54) APPARATUS AND METHOD FOR ENTERING IDLE MODE IN A BROADBAND WIRELESS ACCESS (BWA) SYSTEM

(75) Inventors: Sa-Jin Kim, Seoul (KR); Ju-Young Jung, Suwon-si (KR); Jeong-Hoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 806 days.

(21) Appl. No.: 12/229,256

(22) Filed: Aug. 21, 2008

(65) Prior Publication Data
US 2009/0055671 A1 Feb. 26, 2009

(30) Foreign Application Priority Data
Aug. 24, 2007 (KR) .................. 10-2007-0085342

(51) Int. Cl.
*G06F 1/00* (2006.01)
(52) U.S. Cl. ...................................... 713/323; 370/235
(58) Field of Classification Search .......... 713/320–323; 370/235–236
See application file for complete search history.

(56) References Cited

U.S. PATENT DOCUMENTS
7,609,638 B2   10/2009   Kim et al.

2006/0265617 A1 * 11/2006 Priborsky ............... 713/320

FOREIGN PATENT DOCUMENTS

| JP | 2003-101464 | 4/2003 |
| JP | 2007-036878 | 2/2007 |
| JP | 2009-212594 | 9/2009 |
| KR | 1020050063648 A | 6/2005 |
| KR | 1020060030001 A | 4/2006 |
| WO | WO 2005/060358 A2 | 7/2005 |
| WO | WO 2006/073228 A1 | 7/2006 |
| WO | WO 2006/073297 A1 | 7/2006 |

* cited by examiner

*Primary Examiner* — Clifford Knoll

(57) ABSTRACT

A power saving mode is provided. A method for entering a power saving mode of a terminal includes a first operation for starting a first timer after transmitting an idle mode request message; a second operation for, when an idle mode approval message is not received until the first timer expires, checking whether a number of retransmissions of the idle mode request message exceeds a number of allowed retransmissions of the idle mode request message; a third operation for, when the number of the retransmissions of the idle mode request message exceeds the number of the allowed retransmissions of the idle mode request message, increasing a number of idle mode entry failures; and a fourth operation for, when the increased number of the idle mode entry failures is greater than N times, entering a power saving mode which powers off a modem.

15 Claims, 5 Drawing Sheets

APPARATUS AND METHOD FOR ENTERING IDLE MODE IN A BROADBAND WIRELESS ACCESS (BWA) SYSTEM

CROSS-REFERENCE TO RELATED APPLICATION(S) AND CLAIM OF PRIORITY

This application claims priority under 35 U.S.C. §119(a) to a Korean patent application filed in the Korean Intellectual Property Office on Aug. 24, 2007 and assigned Serial No. 2007-85342, the entire disclosure of which is hereby incorporated by reference.

TECHNICAL FIELD OF THE INVENTION

The present invention relates generally to an apparatus and a method for entering an idle mode in a broadband wireless access (BWA) communication system.

BACKGROUND OF THE INVENTION

In a broadband wireless access (BWA) communication system (herein indicates the Institute of Electrical and Electronics Engineers (IEEE) 802.16e communication system), a terminal sends a DREG-REQ message to a base station to enter an idle mode.

FIG. 1 depicts general idle mode entrance and entrance failure. A terminal 100 includes a modem 105 and a host 110. While a message is transmitted through the modem 105, it is illustrated that the terminal 100 transmits the message to ease the understanding.

When there is no uplink/downlink data traffic over a certain time (hereafter, referred to as a $T_{idletime}$) after a call connection, the terminal 100 enters an idle mode by signaling with a base station 120 so as to avoid power consumption.

To enter the idle mode, the terminal 100 sends an idle mode request message (hereafter, referred to as a DREG-REQ message) in step a), and starts a timer T45 in step b) to receive an idle mode approval message (hereafter, referred to as a DREG-CMD message) from the base station 120 in response to the DREG-REQ message in step b).

When receiving the DREG-CMD message from the base station 120 before the timer T45 expires in step c), the terminal 100 stops the timer T45 in step d) and enters the idle mode in steps e) and f).

When receiving no DREG-CMD message before the timer T45 expires in step g), the terminal 100 retransmits the DREG-REQ message in step h).

When the number of the retransmissions exceeds the number of allowed retransmissions of the idle mode request message (hereafter, referred to as a DREG request retry count) in step i), the terminal 100 commences the initial call connection in step j). Here, the default value of the DREG request retry count is 3.

When the terminal 100 travels in a shadow area, the deteriorated channel condition may cause an increase of the number of the retransmissions of the DREG-REQ message. As a result, the number of the retransmissions of the DREG-REQ message is liable to exceed the DREG request retry count.

In this situation, the terminal 100 can not enter the idle mode but merely repeats the initial call connection because of the failure to enter the idle mode. In addition, the power consumption is increased.

SUMMARY OF THE INVENTION

To address the above-discussed deficiencies of the prior art, it is a primary object of the present invention to address at least the above mentioned problems and/or disadvantages and to provide at least the advantages described below. Accordingly, an aspect of the present invention is to provide an apparatus and a method for entering an idle mode in a broadband wireless access (BWA) system.

Another aspect of the present invention is to provide an apparatus and a method for lowering a power consumption caused by the failure to enter an idle mode when a terminal lies in a shadow area.

The above aspects are achieved by providing a method for entering an idle mode of a terminal. The method includes a first operation for starting a first timer after transmitting an idle mode request message; a second operation for, when an idle mode approval message is not received before the first timer expires, checking whether a number of retransmissions of the idle mode request message exceeds a number of allowed retransmissions of the idle mode request message; a third operation for, when the number of the retransmissions of the idle mode request message exceeds the number of the allowed retransmissions of the idle mode request message, increasing a number of idle mode entry failures; and a fourth operation for, when the increased number of the idle mode entry failures is greater than N times, entering a power saving mode which powers off a modem.

According to one aspect of the present invention, an apparatus for a terminal which enters a power saving mode includes a power saving mode manager for performing a first operation for starting a first timer after transmitting an idle mode request message, performing a second operation for checking whether a number of retransmissions of the idle mode request message exceeds a number of allowed retransmissions of the idle mode request message when an idle mode approval message is not received before the first timer expires, and performing a third operation for, when the number of the retransmissions of the idle mode request message exceeds the number of the allowed retransmissions of the idle mode request message, increasing a number of idle mode entry failures, and performing a fourth operation for, when the increased number of the idle mode entry failures is greater than N times, for entering a power saving mode which powers off a modem; and a timer manager for managing the first timer and the second timer.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged broadband wireless access system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for entering an idle mode in a broadband wireless access (BWA) system.

To enter an idle mode according to an exemplary embodiment of the present invention, when the number of retransmissions of a DREG-REQ message of a terminal exceeds a DREG request retry count, the terminal enters a power saving mode by forcibly powering down a modem without an initial call connection. When a power saving mode release event is generated, the terminal powers on the modem and performs the initial call connection.

Figure 1:
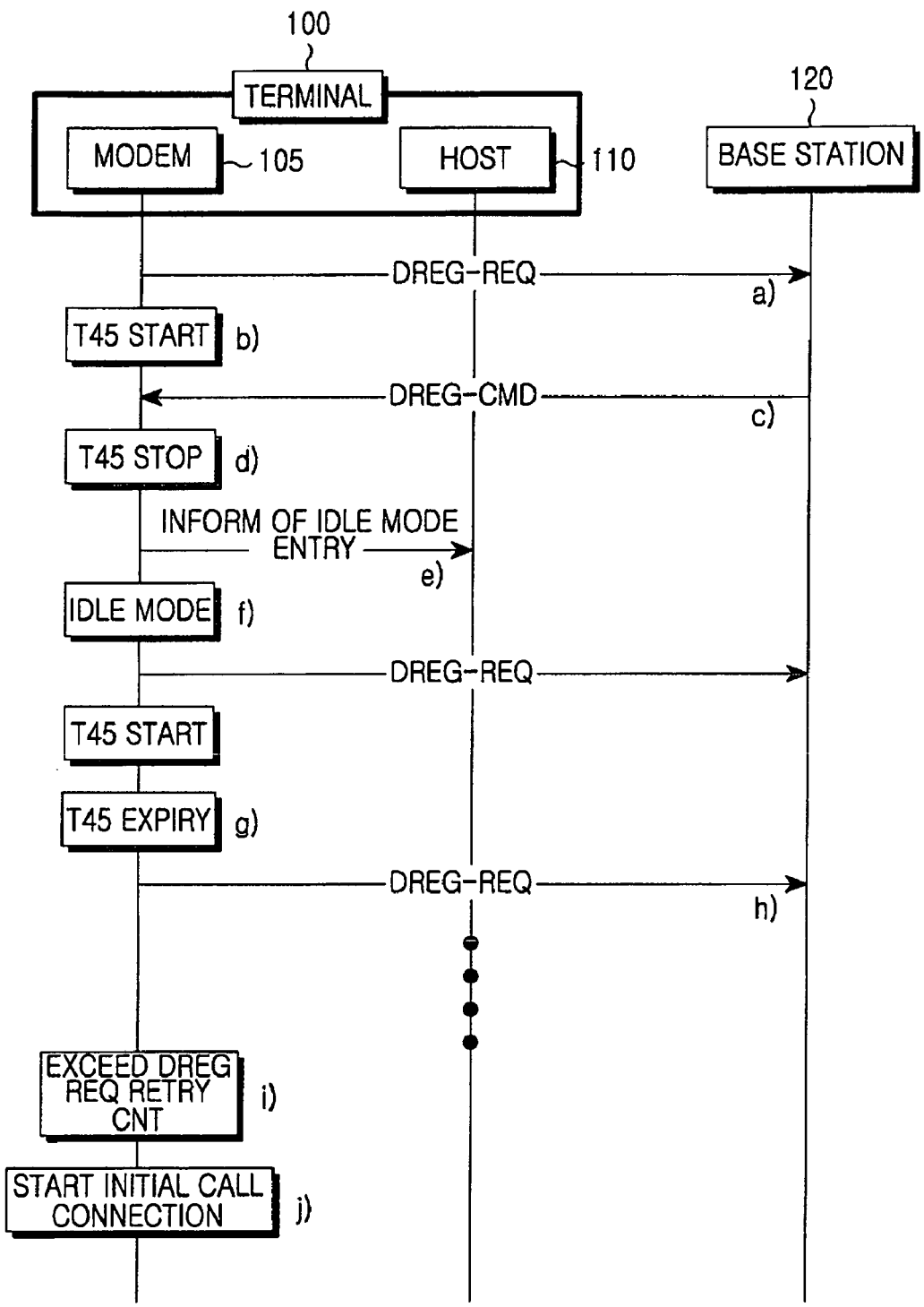
FIG. 1 illustrates general idle mode entrance and entrance failure.
Figure 2:
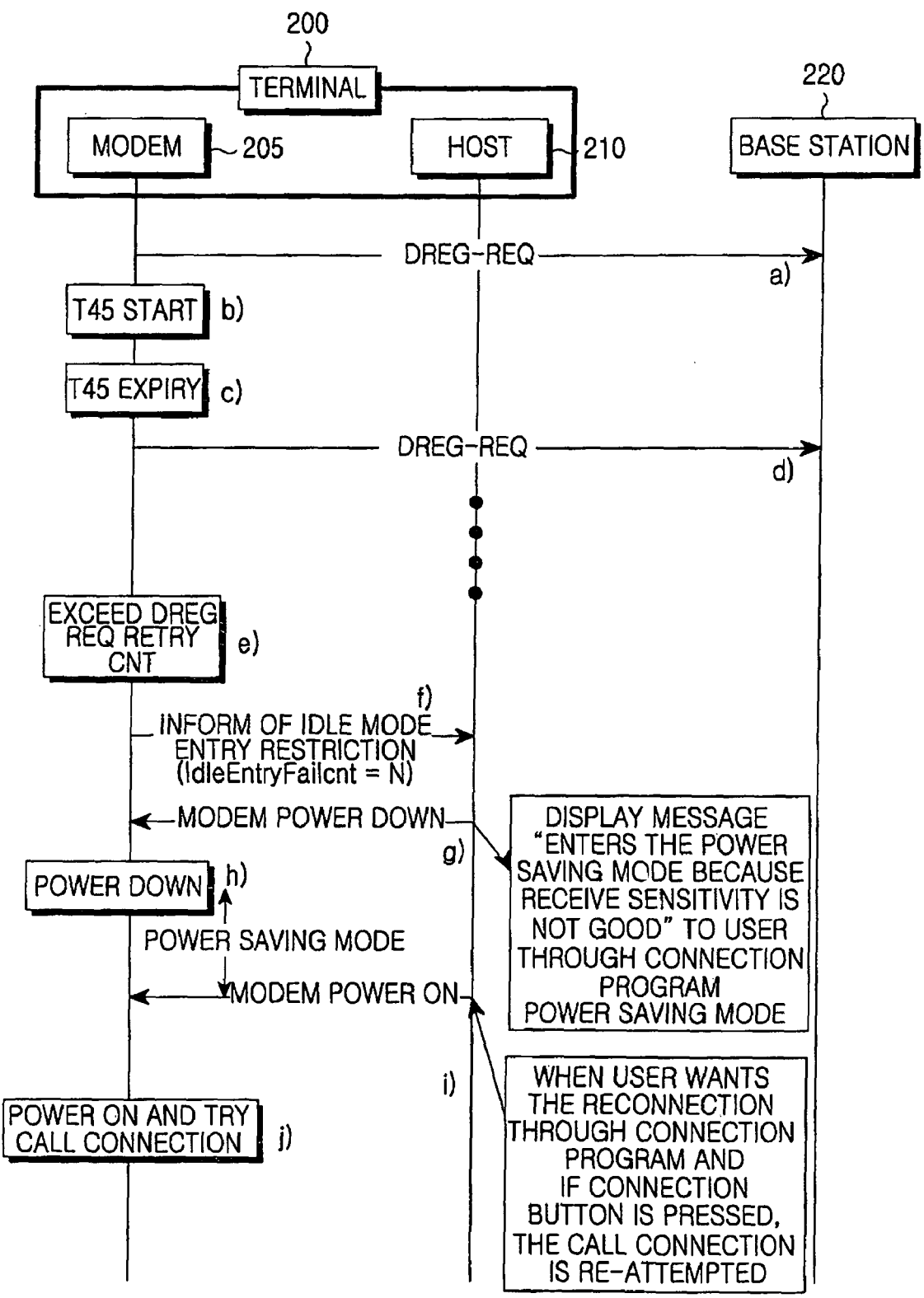
FIG. 2 illustrates a method for handling an idle mode entrance failure according to an exemplary embodiment of the present invention.

FIG. 2 illustrates a method for handling an idle mode entrance failure according to an exemplary embodiment of the present invention.

A terminal 200 sends a DREG-REQ message to enter the idle mode in step a), and starts a timer T45 to receive a DREG-CMD message from a base station 220 in response to the DREG-REQ message in step b).

When receiving no DREG-CMD message before the timer T45 expires in step c), the terminal 200 retransmits the DREG-REQ message in step d).

When the number of retransmissions exceeds a DREG request retry count in step e), a modem 205 of the terminal 200 increases the number of idle mode entrance failures (hereinafter, referred to as a IdleEntryFailCnt) by one and informs a host 210 of the IdleEntryFailCnt in step f). The initial value of the IdleEntryFailCnt is zero.

To retry the idle mode entry, the terminal 200 checks whether there is uplink/downlink data traffic during the $T_{idletime}$. When there is no uplink/downlink data traffic during the $T_{idletime}$, the terminal 200 repeats the steps starting from the DREG-REQ message transmission of step a).

When the IdleEntryFailCnt exceeds N times, the host 210 outputs a message of "Enters the power saving mode because the receive sensitivity is not good" to a user. The message hints a shadow area to the user so as to lead the user, if he/she wants smooth communications, to move into a region of good channel conditions and to try the connection.

Next, the host 210 forcibly powers down the modem 205 to depart from the network in steps g) and h).

When the user moves into another region and tries the access to the network, the call connection to the network can be newly tried by pressing a call button of a connection program. In this case, the host 210 powers on the modem 205 and performs the initial call connection in steps i) and j).

Figure 3A:
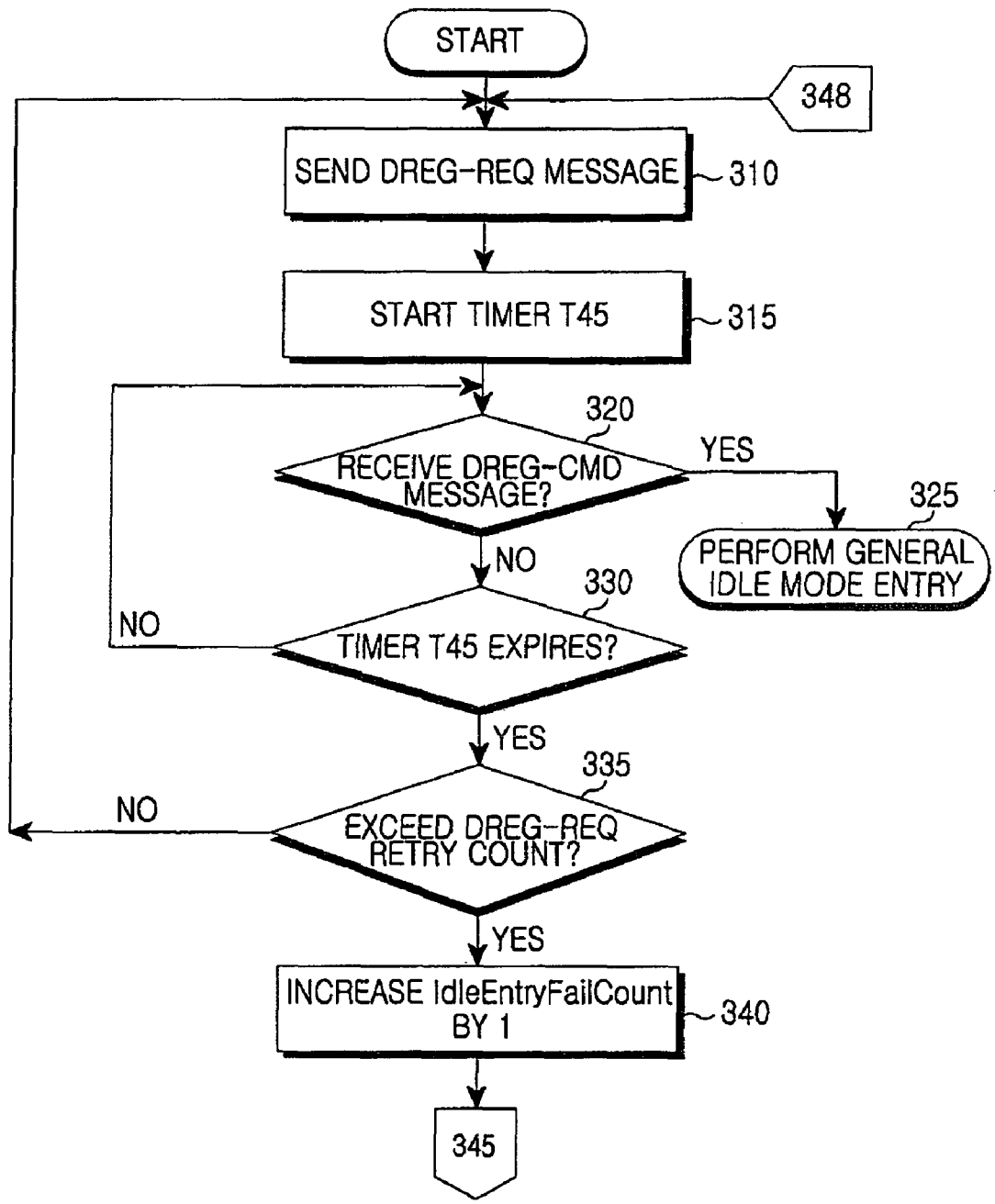
FIG. 3 illustrates operations of a terminal according to an exemplary embodiment of the present invention.
Figure 3B:
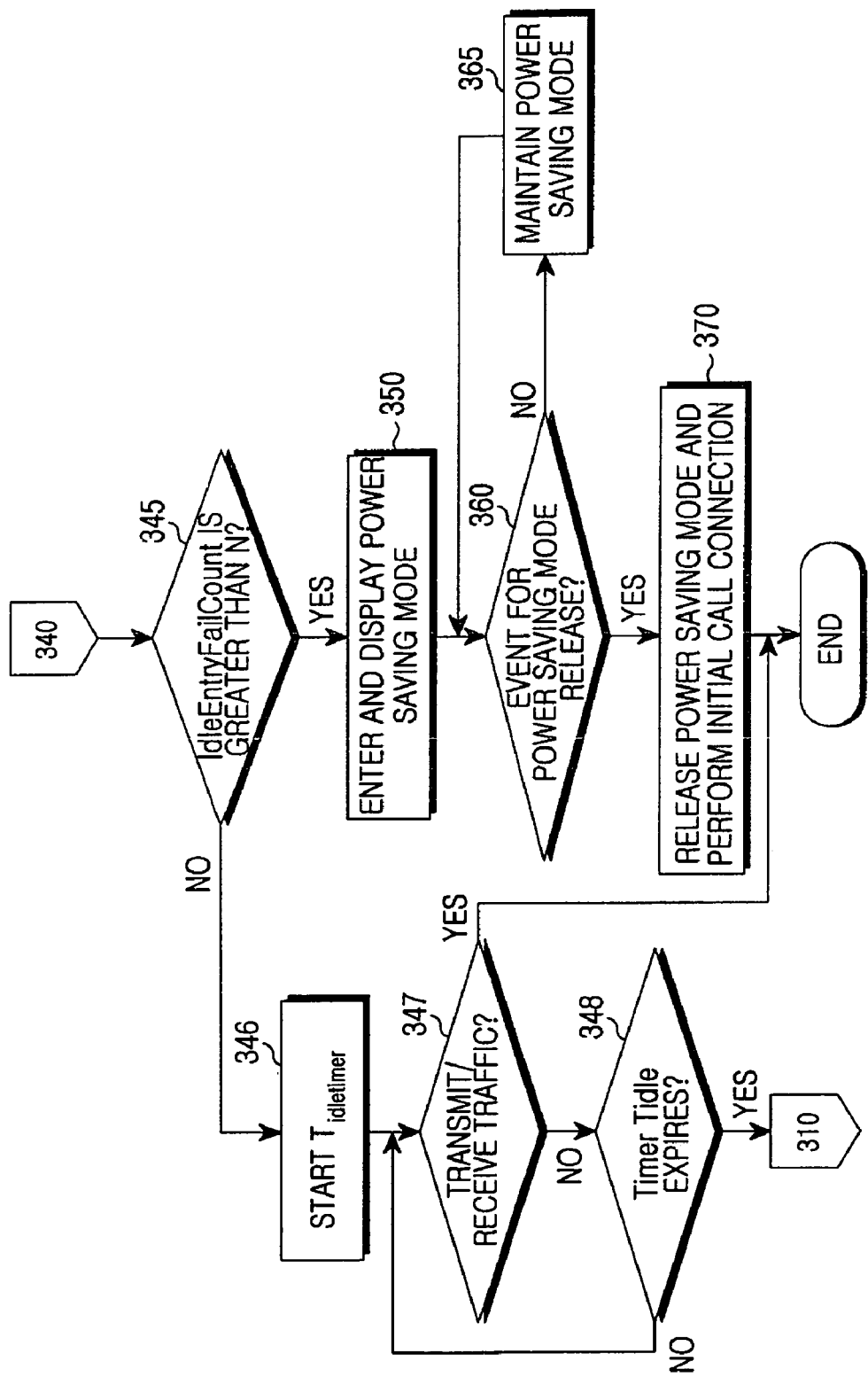

FIG. 3 illustrates operations of a terminal according to an exemplary embodiment of the present invention.

The terminal sends the DREG-REQ message in step 310, and starts the timer T45 to receive a DREG-CMD message from the base station in response to the DREG-REQ message in step 315.

When receiving the DREG-CMD message in step 320, the terminal performs the general idle mode entry in step 325.

When no DREG-CMD message is received in step 320 and the timer T45 does not expire in step 330, the terminal waits to receive the DREG-CMD message in step 320.

When the timer T45 expires in step 330 and the number of retransmissions of the DREG-REQ message does not exceed the DREG request retry count in step 335, the terminal retransmits the DREG-REQ message in step 310.

When the number of the retransmissions of the DREG-REQ message exceeds the DREG request retry count in step 335, the terminal increases the IdleEntryFailCnt by 1 in step 340. When the IdleEntryFailCnt is not greater than N times in step 345, the terminal starts the timer $T_{idletimer}$ in step 346.

When there is no transmit/receive traffic in step 347 before the timer $T_{idletimer}$ expires in step 348, the terminal retransmits the DREG-REQ message in step 310.

When the IdleEntryFailCnt is greater than the N times in step 345, the terminal enters the power saving mode which powers off the modem, and displays or outputs the power saving mode in step 350.

When the release event for the power saving mode is not generated in step 360, the terminal maintains the power saving mode in step 365.

When the release event for the power saving mode occurs in step 360, the terminal releases the power saving mode and performs the initial call connection in step 370.

Figure 4:
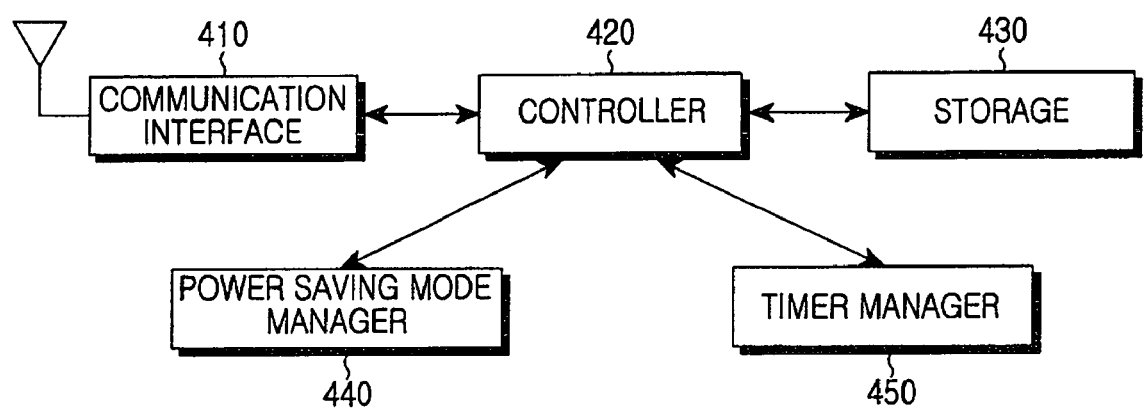
FIG. 4 illustrates a structure of a terminal according to an exemplary embodiment of the present invention.

FIG. 4 is a block diagram of the terminal according to an exemplary embodiment of the present invention.

The terminal of FIG. 4 includes a communication interface 410, a controller 420, a storage 430, a power saving mode manager 440, and a timer manager 450.

The communication interface 410, which is a module for communicating with other nodes, includes a wireless processor and a baseband processor. The wireless processor converts a signal received on an antenna to a baseband signal and provides the baseband signal to the baseband processor. The wireless processor converts a baseband signal output from the baseband processor to a radio signal transmittable over the air and then transmits the radio signal over the antenna. The communication interface 410 includes the modem of the present invention.

The controller 420 controls the operations of the terminal. Particularly, the controller 420 controls the power saving mode manager 440 and the timer manager 450.

The storage 430 stores a program for controlling the operations of the terminal and temporary data generating in the program execution.

The power saving mode manager 440 sends the DREG-REQ message and requests the timer manager 450 to start the timer T45 so as to receive the DREG-CMD message from the base station in response to the DREG-REQ message.

When the terminal receives the DREG-CMD message, the power saving mode manager 440 performs the general idle mode entry. When the terminal receives no DREG-CMD message and is not informed of the expiry of the timer T45 from the timer manager 450, the terminal waits to receive the DREG-CMD message.

When the power saving mode manager 440 is informed of the expiry of the timer T45 from the timer manager 450 and the number of the retransmissions of the DREG-REQ message does not exceed the DREG request retry count, the power saving mode manager 440 retransmits the DREG-REQ message.

When the number of the retransmissions of the DREG-REQ message exceeds the DREG request retry count, the power saving mode manager 440 increases the IdleEntryFailCnt by 1. When the IdleEntryFailCnt is not greater than the N times, the power saving mode manager 440 requests the timer manager 450 to start the timer $T_{idletimer}$.

When there is no transmit/receive traffic before the timer manager 450 informs of the expiry of the timer $T_{idletimer}$, the power saving mode manager 440 retransmits the DREG-REQ message.

When the IdleEntryFailCnt is greater than the N times, the power saving mode manager 440 enters the power saving mode which powers off the modem, and displays or outputs the power saving mode. When a release event for the power saving mode does not occur, the power saving mode manager 440 maintains the power saving mode.

When a release event for the power saving mode is issued, the power saving mode manager 440 releases the power saving mode and performs the initial call connection.

The timer manager 450 manages the timer required to operate the communication interface 410, the timer $T_{idletimer}$ in relation with the uplink/downlink data traffic activation, and the timer T45.

As constructed above, the controller 420 can function as the power saving mode manager 440 and the timer manager 450. Here, they are separately provided to distinguish their function.

In the actual implementation, the controller 420 may process all or part of the function of the power saving mode manager and the function of the timer manager 450.

In the light of the foregoing, when the terminal lies in a shadow area, the power consumption of the terminal can be minimized by preventing the initial call connection conducted because of the signaling failure for the idle mode entry.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for entering an idle mode of a terminal, the method comprising:
   a first operation for starting a first timer after transmitting an idle mode request message;
   a second operation for, when an idle mode approval message is not received before the first timer expires, checking whether a number of retransmissions of the idle mode request message exceeds a number of allowed retransmissions of the idle mode request message;
   a third operation for, when the number of the retransmissions of the idle mode request message exceeds the number of the allowed retransmissions of the idle mode request message, increasing a number of idle mode entry failures; and
   a fourth operation for, when the increased number of the idle mode entry failures is greater than a value, entering a power saving mode which powers off a modem of the terminal.

2. The method of claim 1, further comprising:
   entering an idle mode when the idle mode approval message is received before the first timer expires.

3. The method of claim 1, further comprising:
   starting a second timer when the increased number of the idle mode entry failures is not greater than the value; and
   repeating the first operation to the third operation when there is no transmit/receive traffic before the second timer expires.

4. The method of claim 1, further comprising, after entering the power saving mode:
   outputting an information relating to the power saving mode entry.

5. The method of claim 1, further comprising:
   releasing the power saving mode and performing an initial call connection when a release event for the power saving mode is generated.

6. An apparatus for a terminal which enters a power saving mode, comprising:
   a power saving mode manager for performing a first operation for starting a first timer after transmitting an idle mode request message, performing a second operation for checking whether a number of retransmissions of the idle mode request message exceeds a number of allowed retransmissions of the idle mode request message when an idle mode approval message is not received before the first timer expires, and performing a third operation for, when the number of the retransmissions of the idle mode request message exceeds the number of the allowed retransmissions of the idle mode request message, increasing a number of idle mode entry failures, and performing a fourth operation for, when the increased number of the idle mode entry failures is greater than a value, for entering a power saving mode which powers off a modem of the terminal; and
   a timer manager for managing the first timer.

7. The apparatus of claim 6, wherein the power saving mode manager enters an idle mode when the idle mode approval message is received before the first timer expires.

8. The apparatus of claim 6, wherein the power saving mode manager starts a second timer when the increased number of the idle mode entry failures is not greater than the value, and repeats the first operation to the third operation when there is no transmit/receive traffic before the second timer expires.

9. The apparatus of claim 6, wherein the power saving mode manager outputs an information relating to the power saving mode entry after entering the power saving mode.

10. The apparatus of claim 6, wherein the power saving mode manager releases the power saving mode and performs an initial call connection when a release event for the power saving mode is generated.

11. A method for entering an idle mode of a terminal, the method comprising:
transmitting an idle mode request message;
starting a first timer;
if an idle mode approval message is not received until before the first timer expires, determining whether a number of retransmissions of the idle mode request message exceeds a number of allowed retransmissions of the idle mode request message;
if the number of the retransmissions of the idle mode request message is determined to exceed the number of the allowed retransmissions of the idle mode request message, increasing a number of idle mode entry failures; and
if the increased number of the idle mode entry failures is greater than N a predetermined value, entering a power saving mode which powers off a modem of the terminal.

12. The method of claim 11, further comprising:
if an idle mode approval message is received until before the first timer expires, entering an idle mode.

13. The method of claim 11, further comprising:
if the increased number of the idle mode entry failures is not greater than N the predetermined value, starting a second timer; and
transmitting the idle mode request message when no transmit/receive traffic occurs until before the second timer expires.

14. The method of claim 11, further comprising:
outputting an information relating to entering the power saving mode.

15. The method of claim 11, further comprising:
releasing the power saving mode and performing an initial call connection when a release event for the power saving mode is occurs.

* * * * *